United States Patent
Kato et al.

(10) Patent No.: US 8,311,704 B2
(45) Date of Patent: Nov. 13, 2012

(54) CONTROL APPARATUS OF VARIABLE DAMPING FORCE DAMPER

(75) Inventors: Takafumi Kato, Saitama (JP); Toshimitsu Kaji, Saitama (JP); Masaki Izawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 921 days.

(21) Appl. No.: 12/051,638

(22) Filed: Mar. 19, 2008

(65) Prior Publication Data

US 2008/0234896 A1    Sep. 25, 2008

(30) Foreign Application Priority Data

Mar. 20, 2007  (JP) .................................. 2007-071719
Mar. 27, 2007  (JP) .................................. 2007-081115

(51) Int. Cl.
  *B60G 17/00*  (2006.01)
  *B60G 17/06*  (2006.01)
(52) U.S. Cl. ............................................................ 701/37
(58) Field of Classification Search ................. 701/37, 701/38, 116; 280/5.512, 5.515; 188/250 E, 188/266.1, 378, 379, 381; 74/473.29, 574.1–574.4, 74/604; 192/70.17, 30 V
See application file for complete search history.

(56) References Cited

U.S. PATENT DOCUMENTS

| | | | |
|---|---|---|---|
| 5,608,630 A * | 3/1997 | Poelouev | 701/36 |
| 5,642,899 A * | 7/1997 | Inoue et al. | 280/5.515 |
| 5,718,446 A * | 2/1998 | Fuchida | 280/124.157 |
| 5,828,970 A * | 10/1998 | Kimura et al. | 701/37 |
| 5,911,768 A * | 6/1999 | Sasaki | 701/38 |
| 5,944,763 A * | 8/1999 | Iwasaki | 701/37 |
| 6,366,841 B1 * | 4/2002 | Ohsaku | 701/37 |
| 2005/0085969 A1 * | 4/2005 | Kim | 701/37 |
| 2006/0047387 A1 | 3/2006 | Izawa et al. | |
| 2007/0150143 A1 * | 6/2007 | Stiller et al. | 701/37 |

FOREIGN PATENT DOCUMENTS

| | | |
|---|---|---|
| JP | 06-027218 U | 4/1994 |
| JP | 9-109642 A | 4/1997 |
| JP | 2006076319 A * | 3/2006 |

OTHER PUBLICATIONS

Japanese Office Action from JP App. No. 2007-081115 dated on Jan. 17, 2012.

* cited by examiner

*Primary Examiner* — Mary Cheung
(74) *Attorney, Agent, or Firm* — Arent Fox LLP

(57) ABSTRACT

A control apparatus of a variable damping force damper used to suspend a vehicle body of a vehicle is configured to set a target control quantity of the variable damping force damper based on a plurality of dynamic state quantities of the vehicle, wherein the plurality of dynamic state quantities include a vertical dynamic state quantity of the vehicle.

7 Claims, 15 Drawing Sheets

CONTROL APPARATUS OF VARIABLE DAMPING FORCE DAMPER

TECHNICAL FIELD

The present invention relates to a control apparatus of a variable damping force damper used in a vehicle suspension system, and particularly relates to a control apparatus of a variable damping force damper that can improve riding comfort in such cases as when a vehicle is undergoing a slalom run on a road having surface irregularities.

BACKGROUND OF THE INVENTION

In recent years, in a field of dampers (shock absorbers) used in a vehicle suspension system, various types of variable damping force dampers that can variably control the damping force in steps or continuously have been developed. In the past, variable damping force dampers of a mechanical type were common in which a flow area of an orifice was controlled by using a motor, solenoid and the like, but in recent years, variable damping force dampers of a current control type have been developed in which a magnetic fluid or magneto-rheological fluid (MRF) is used as an operating fluid and an electric current supplied to a magnetic fluid valve is increased/decreased to control an apparent viscosity of the operating fluid.

In a vehicle equipped with a variable damping force damper of a current control type (simply referred to as a damper hereinafter), it is possible to improve the maneuverability and riding comfort of the vehicle by variably changing the control current of the damper within a prescribed range (e.g., 0-5 A) and thereby changing the damping force of the damper depending on operating conditions of the vehicle (see, for example, United States Patent Application Publication No. 2006/0047387). For instance, during a turn of the vehicle in which the vehicle body can roll in left and right directions due to an inertial force (lateral acceleration) resulting from the lateral movement of the vehicle, the control current of the damper can be set to a higher value so that the damping force of the damper is increased in accordance with a differentiation value of the lateral acceleration, to thereby suppress an excessive rolling of the vehicle body. Also, during a travel of the vehicle on a road having small surface irregularities in which the wheels of the vehicle can move up and down in short intervals, the control current is set to a lower value to reduce the damping force of the damper according to an actual stroke speed of the damper, to thereby suppress transmission of the up-down movements of the wheels to the vehicle body via the suspension or to ease impact from the wheels to the vehicle body.

In the above described damping force control technique, when the differentiation value of the lateral acceleration becomes large (and hence the target damping force becomes high) during a slalom run of the vehicle, for example, it becomes difficult for the damper to undergo telescopic movements in response to irregularities of the road surface. Particularly, when the differentiation value of the lateral acceleration exceeds a certain value, the control current of the damper can be fixed to its upper limit value (e.g., 5 A) irrespective of increase/decrease in the actual stroke speed of the damper. As a result, the reduction of damping force in response to increase in the stroke speed (or easing of the impact from the wheels) cannot be carried out, and this can deteriorate the riding comfort.

BRIEF SUMMARY OF THE INVENTION

The present invention has been made to solve the above prior art problems, and a primary object of the present invention is to provide a control apparatus of a variable damping force damper that can improve the riding comfort even in such cases as when the vehicle travels on a winding or zigzag road with surface irregularities.

According to the present invention, there is provided a control apparatus of a variable damping force damper used to suspend a vehicle body of a vehicle, the control apparatus being configured to set a target control quantity of the variable damping force damper based on a plurality of dynamic state quantities of the vehicle, wherein the plurality of dynamic state quantities include a vertical dynamic state quantity of the vehicle.

The plurality of dynamic state quantities of the vehicle may include dynamic state quantities of the vehicle body such as a vehicle speed, lateral acceleration, longitudinal acceleration and yaw rate as well as dynamic state quantities of the variable control damper such as a stroke speed of the damper. The vertical dynamic state quantity of the vehicle may comprises the vertical acceleration of the vehicle body or the stroke speed of the damper. Further, the target control quantity of the variable control damper may be an electric current when the variable damping force damper is a current control type.

According to the above control apparatus, because the target control quantity of the damper can be variably set in response to a change in the vertical dynamic state quantity of the vehicle caused by road surface irregularities, it is possible to ease impact from the wheels.

According to one embodiment of the invention, the vertical dynamic state quantity of the vehicle may include an actual stroke speed of the variable damping force damper, and the control apparatus may comprise: a target damping force setting unit for setting a target damping force of the variable damping force damper based on at least part of the plurality of dynamic state quantities of the vehicle; a base control quantity setting unit for setting a base control quantity of the variable damping force damper based on the target damping force and the actual stroke speed of the variable damping force damper; a damping force determining unit for determining whether or not the target damping force exceeds a prescribed high damping determination threshold value; a virtual damping force calculating unit for calculating a virtual damping force by multiplying the target damping force with a prescribed reduction coefficient; a virtual target control quantity setting unit for setting a virtual target control quantity of the variable damping force damper based on the virtual damping force and the actual stroke speed of the variable damping force damper; a correction control quantity calculating unit for calculating a correction control quantity based on the virtual target control quantity; and a target control quantity calculating unit for calculating the target control quantity by subtracting the correction control quantity from the base control quantity when the damping force determining unit determines that the target damping force exceeds the prescribed high damping determination threshold value.

According to such a structure, even when the target damping force becomes high in such cases as when the vehicle undergoes a slalom run, it is ensured that the target control quantity (and hence the damping force) is allowed to decrease in response to an increase of the actual stroke speed (and increase in response to a decrease of the actual stroke speed), and thus it is possible to ease upward impact caused by road surface irregularities and improve riding comfort.

Preferably, the target control quantity setting unit further comprises a virtual reference control quantity setting unit for setting a virtual reference control quantity of the variable damping force damper based on the virtual damping force and a prescribed reference stroke speed, and the correction control quantity calculating unit calculates the correction control quantity by subtracting the virtual target control quantity from the virtual reference control quantity and multiplying the subtraction result with a prescribed restoration coefficient. In this way, it is possible to calculate the correction control quantity in a relatively simple calculation process, to thereby reduce the manufacturing cost of the control apparatus and/or improve the processing speed.

According to another embodiment of the present invention, the vertical dynamic quantity of the vehicle may include a vertical dynamic quantity of the vehicle body, and the control apparatus may comprise: a target damping force setting unit for setting a target damping force of the variable damping force damper based on a first subset of the plurality of dynamic state quantities of the vehicle, and a target control quantity setting unit for setting the target control quantity of the variable damping force damper based on at least the target damping force, wherein the first subset of the plurality of dynamic state quantities of the vehicle includes the vertical dynamic quantity of the vehicle body.

According to such a structure, the even when the differentiation value of the lateral acceleration is large (i.e., the target damping force base value DB is large) and hence the telescopic movements of the damper could be difficult, it is possible to allow the target control quantity to be increased/decreased to ease upward impact when the vertical accelerations of the vehicle body are generated due to road surface irregularities, and therefore it is possible to effectively prevent deterioration of riding comfort.

Preferably, the target damping force setting unit comprises: a target damping force base value setting unit for setting a target damping force base value based on a second subset of the plurality of dynamic state quantities of the vehicle; a correction value setting unit for setting a damping force correction value based on the vertical dynamic state quantity of the vehicle body; and a target damping force calculating unit for calculating the target damping force by subtracting the damping force correction value from the target damping force base value.

In this way, it is possible to provide the control apparatus in a simple structure.

Other features, objects and advantages of the present invention will be appreciated more fully from the following description with reference to appended drawings.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
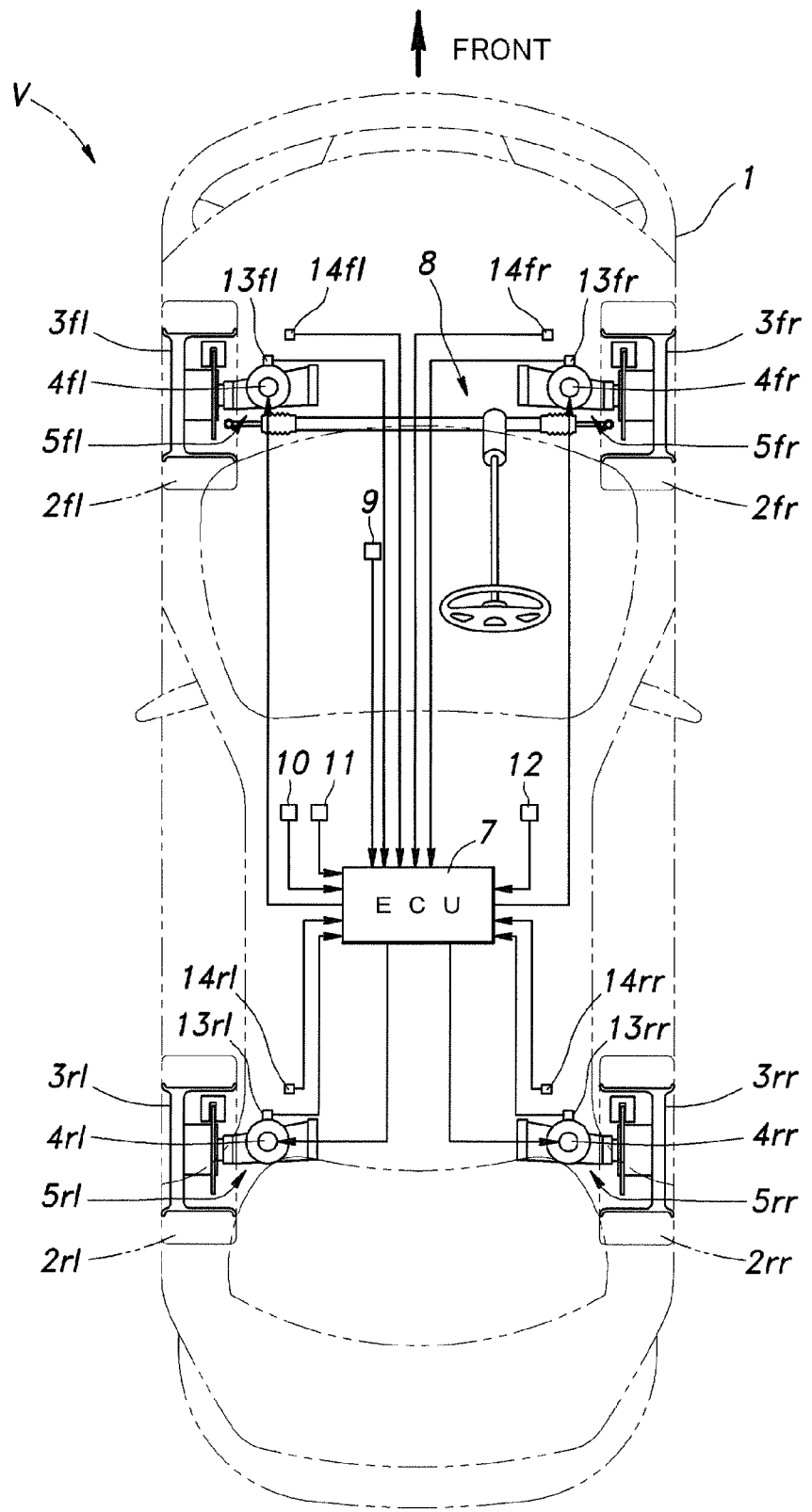
FIG. 1 is a general structural view of a four-wheeled automobile regarding a first embodiment of the invention.
Figure 2:
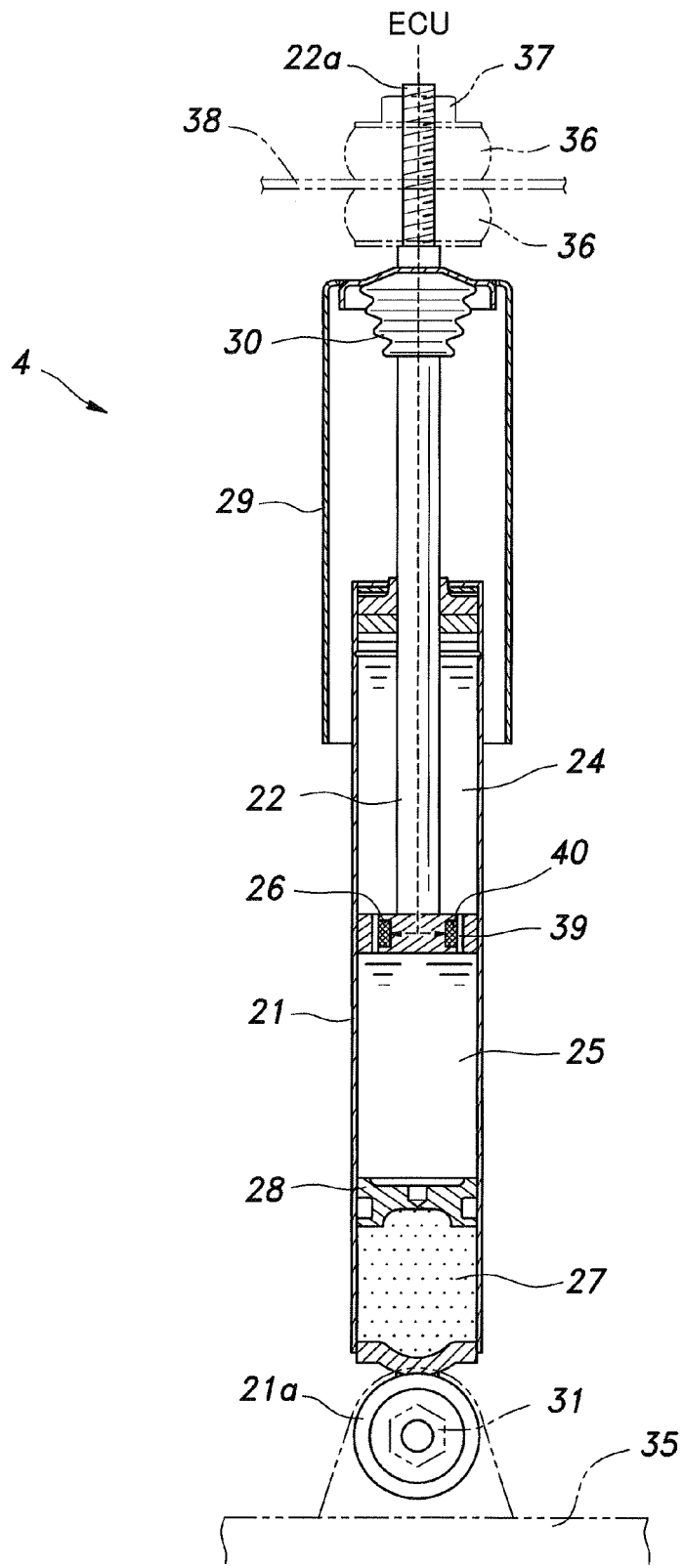
FIG. 2 is a longitudinal cross-sectional view of a damper regarding the first embodiment.
Figure 3:
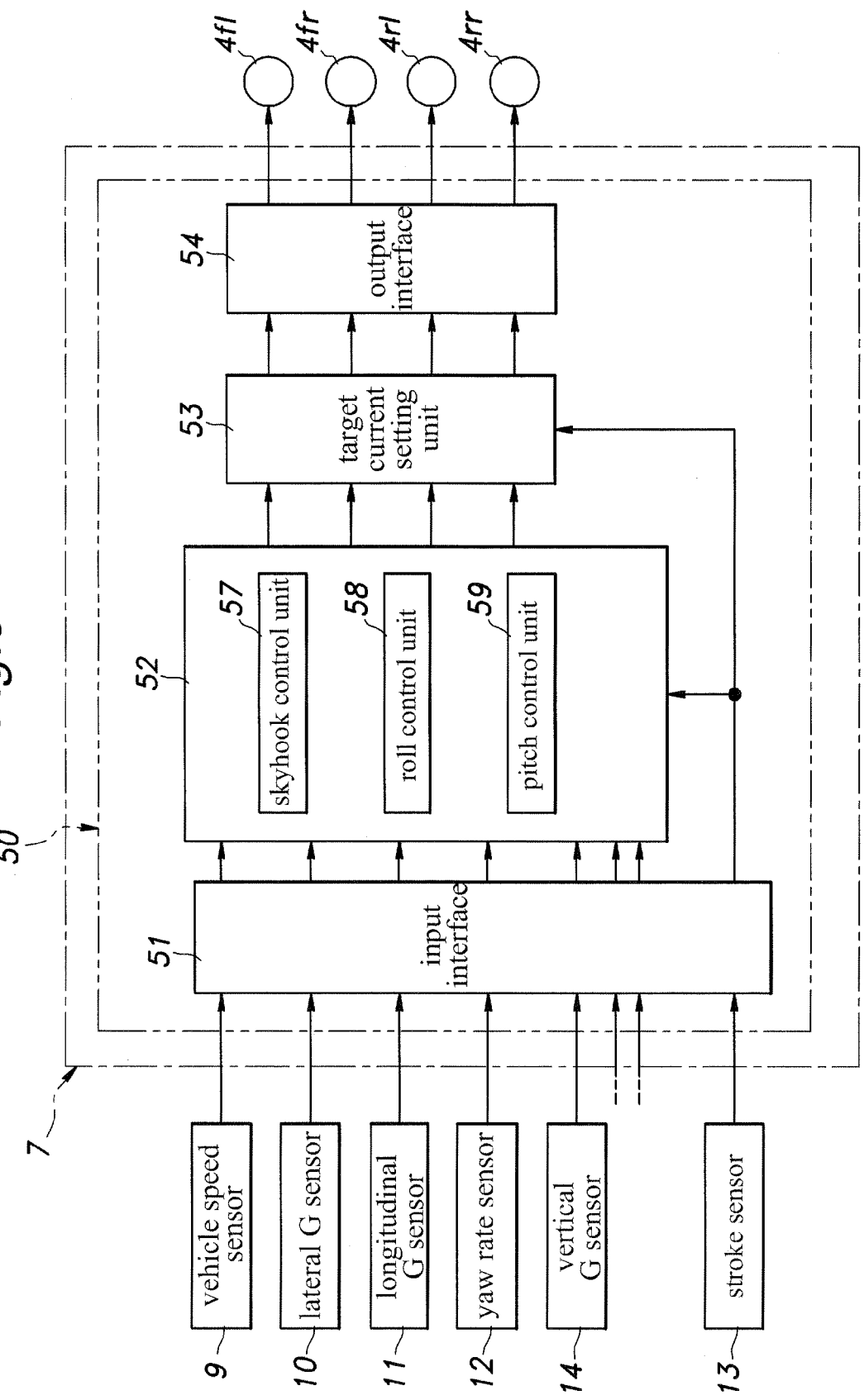
FIG. 3 is a block diagram showing a general structure of a damping force control apparatus regarding the first embodiment.

Referring to the drawings, preferred embodiments of the present invention will be described in detail hereinafter, in which the present invention is applied to a four-wheeled automobile. FIG. 1 is a general structural view of the four-wheeled automobile to which the present invention is applied, FIG. 2 is a longitudinal cross-sectional view of a damper regarding the embodiments, and FIG. 3 is a block diagram showing a general structure of a damping force control apparatus regarding the embodiments.

First Embodiment

General Structure of Automobile

First, with reference to FIG. 1, an explanation is made to a general structure of an automobile to which the invention is applied. It should be noted that in the following explanation, reference signs designating the four wheels and devices provided therefor comprise a number followed by a pair of alphabets indicating the position thereof. For example, the front left wheel is designated with "3fl", front right wheel is designated with "3fr", rear left wheel is designated with "3rl", and rear right wheel is designated with "3rr". When referring to the wheels as a whole, only the number (3) is used such as "wheels 3".

As shown in FIG. 1, the automobile (vehicle) V comprises four wheels 3 each of which is fitted with a tire 2, and each wheel 3 is suspended from a vehicle body 1 by means of a suspension 5 constituted by a suspension arm, spring, MRF-type variable damping force damper (simply referred to as damper, hereinafter) 4, and so on. The automobile V further comprises an ECU (Electronic Control Unit) 7 for controlling the suspension system, and an EPS (Electronic Power Steering) 8. Also, the automobile V comprises a vehicle speed sensor 9 for detecting a vehicle traveling speed, a lateral G sensor 10 for detecting a lateral acceleration, a longitudinal G sensor 11 for detecting a longitudinal acceleration, a yaw rate sensor 12 for detecting a yaw rate, etc., which are disposed at appropriate locations of the vehicle body 1. Further, a stroke sensor 13 for detecting a displacement of the damper 4 and a vertical G sensor 14 for detecting a vertical acceleration of a portion near a wheel house are provided for each wheel 3. It should be noted that an actual stroke speed Ss of the damper 4 can be obtained by differentiating the displacement of the damper 4 detected by the stroke sensor 13, and thus the stroke sensor 13 can server as stroke speed sensor.

The ECU 7 is constituted by a microcomputer, ROM, RAM, peripheral circuits, input/output interface, various driver circuits and so on, and is connected to the damper 4 of each wheel 3 as well as to the sensors 9-14 via a communication network, which in this embodiment consists of a CAN (Controller Area Network).

<Structure of Damper>

As shown in FIG. 2, the damper 4 of this embodiment is of a mono tube type (De Carbon type), and comprises a cylindrical cylinder tube 21 filled with an MRF (Magneto-Rheological Fluid), a piston rod 22 received in the cylinder tube 21 so as to be slidable in an axial direction, a piston 26 attached to an end of the piston rod 22 to partition the inner space of the cylinder tube 21 into an upper oil chamber 24 and a lower oil chamber 25, a free piston 28 that defines a high pressure gas chamber 27 in a lower part of the cylinder tube 21, a cover 29 for preventing dust from adhering to the piston rod 22 or the like, and a bump stop 30 for absorbing an impact in a full bound.

The cylinder tube 21 is connected to an upper surface of a trailing arm 35, which is a member on a wheel side, by means of a bolt 31 passed through an eye piece 21a provided at a lower end of the cylinder tube 21. The piston rod 22 is provided with a stud 22a at an upper end thereof, and the stud 22a is connected to a damper base (wheel house upper portion) 38, which is a member on a vehicle body side, by means of upper and lower bushes 36 and a nut 38.

As shown in FIG. 2, the piston 26 is formed with an annular connection passage 39 for connecting the upper oil chamber 24 and the lower oil chamber 25 to each other, and is provided with an MLV coil 40 disposed inward of the annular connection passage 39. When an electric current is supplied to the MLV coil 40 from the ECU 7, a magnetic field is applied to the MRF flowing through the annular communication passage 39 whereby ferromagnetic particles form chain-like clusters to increase an apparent viscosity of MRF flowing through the annular connection passage 39.

<General Structure of Damper Control Apparatus>

The ECU 7 includes a damper control apparatus 50 having a general structure as shown in FIG. 3. The damper control apparatus 50 is constituted by an input interface 51 to which the sensors 9-14 are connected, a damping force setting unit 52 for setting a target damping force Dtgt of each damper 4 based on the signals from the sensors 9-12 and 14, a target current setting unit 53 for setting a target current Itgt for each damper 4 (MLV coil 40) according to the target damping force Dtgt and the actual stroke speed Ss from the stroke sensor 13, and an output interface 54 for supplying each damper 4 with drive current according to the target current Itgt set by the target current setting unit 53. The damping force setting unit 52 includes a skyhook control unit 56 for conducting a skyhook control, a roll control unit 58 for conducting a roll control, and a pitch control unit 59 for conducting a pitch control.

<Target Current Setting Unit>

Figure 4:
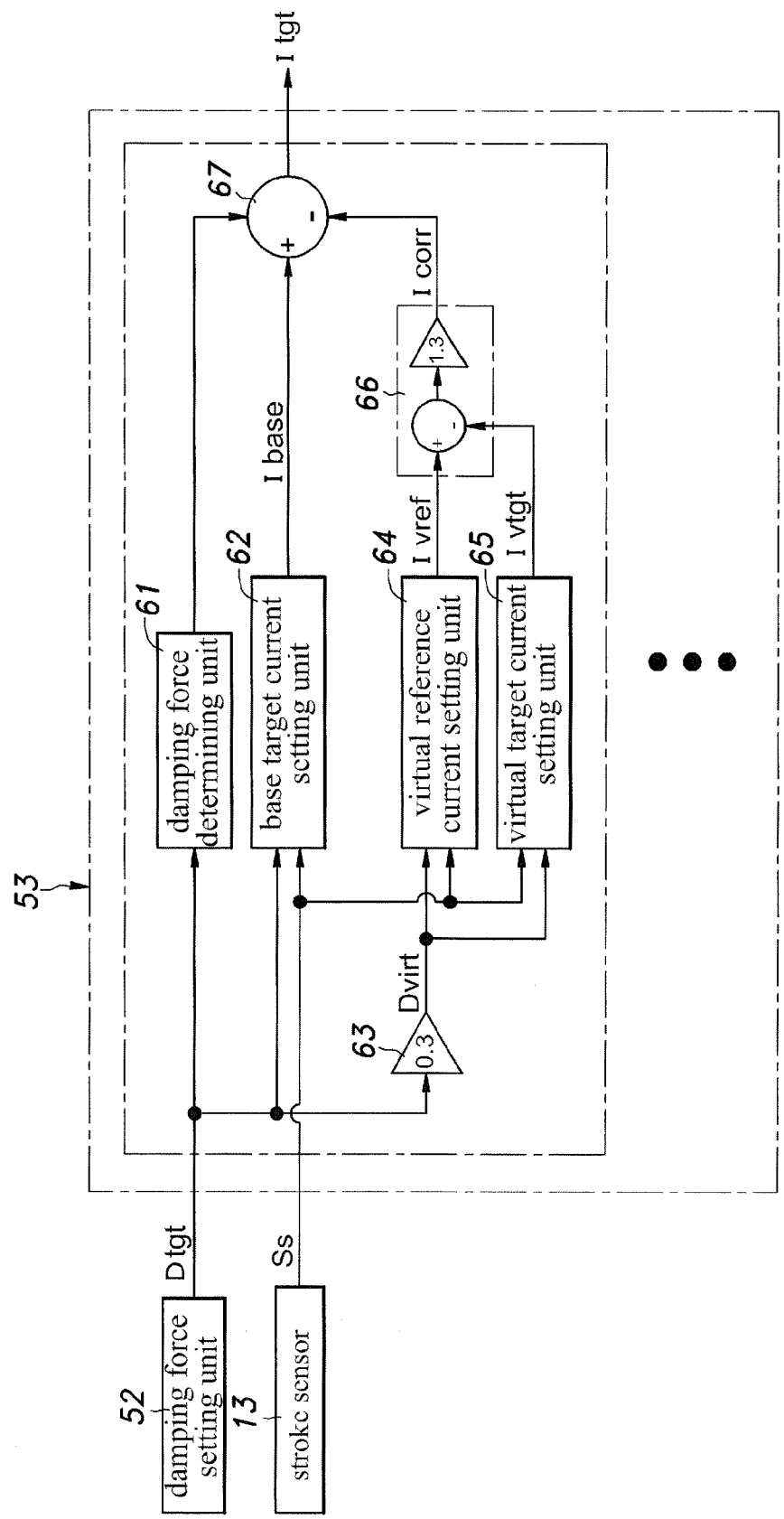
FIG. 4 is a block diagram showing a general structure of a roll control unit regarding the first embodiment.

As shown in FIG. 4, the target current setting unit 53, which serves as a target control quantity setting unit, comprises, for each wheel 3: a damping force determining unit 61 for determining a type or amount of the target damping force Dtgt input from the damping force setting unit 52; a base target current setting unit 62 for setting a base target current Ibase based on the target damping force Dtgt and the actual stroke speed Ss; a virtual damping force calculating unit 63 for calculating a virtual damping force Dvirt by multiplying the target damping force Dtgt with a predetermined reduction coefficient; a virtual reference current setting unit 64 for setting a virtual reference current Ivref based on the virtual damping force Dvirt and a reference stroke speed Sr (i.e., a relatively small speed having the same direction as the actual stroke speed Ss); a virtual target current setting unit 65 for setting a virtual target current Ivtgt based on the virtual damping force Dvirt and the actual stroke speed Ss; a correction current calculating unit 66 for calculating a correction current Icorr by multiplying a difference between the virtual reference current Ivref and the virtual target current Ivtgt with a prescribed restoration coefficient; and a target current calculating unit 67 for calculating a target current Itgt by subtracting the correction current Icorr from the base target current Ibase. It should be noted that the target current calculating unit 67 selectively performs the above subtraction based on a command from the damping force determining unit 61.

Function

<General Flow of Damping Force Control>

Figure 5:
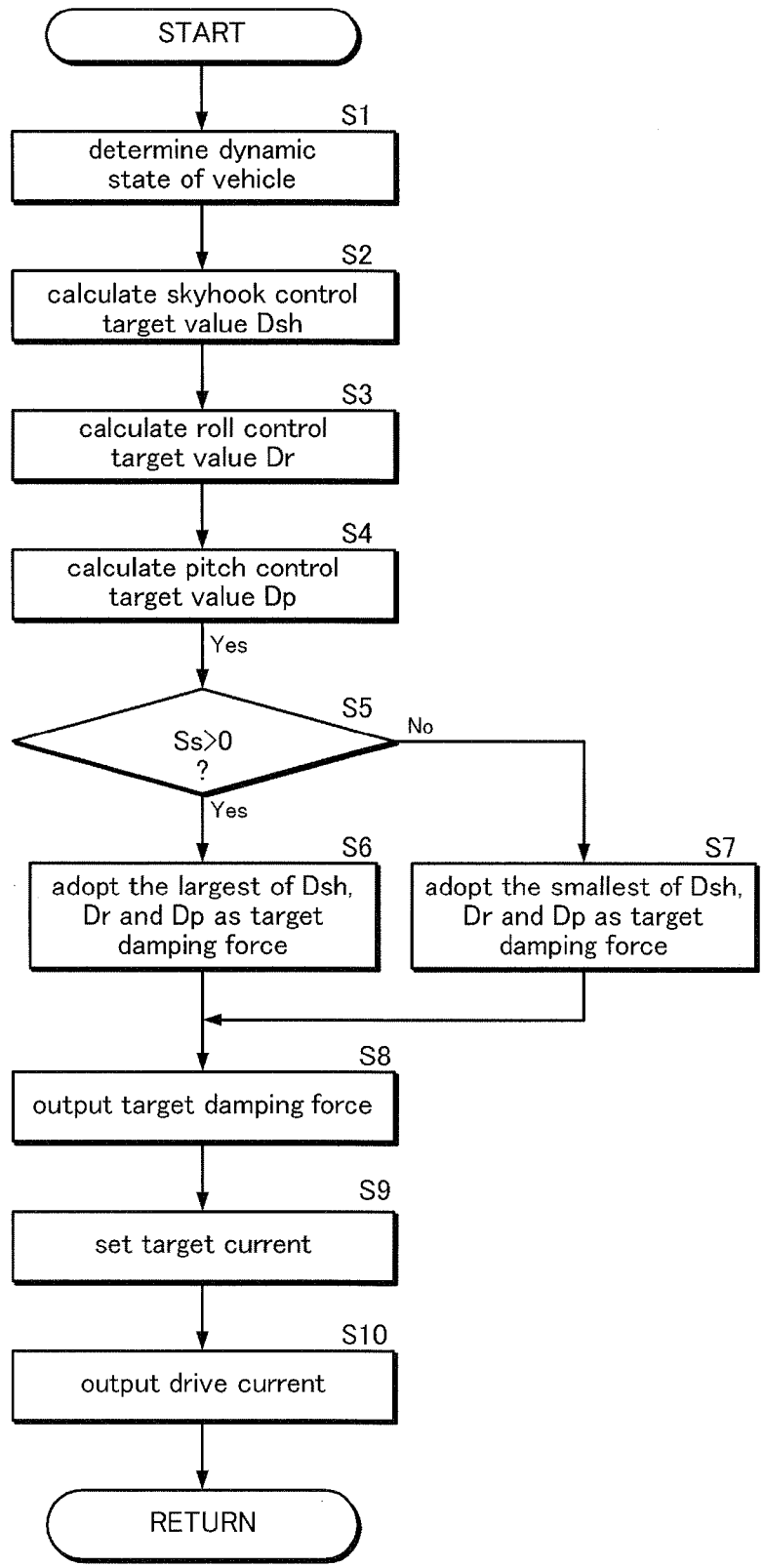
FIG. 5 is a flowchart showing the steps of target damping force setting process regarding the first embodiment.

When the automobile has started moving, the damper control apparatus 50 conducts a process for controlling the target current of the damper 4, as shown in the flowchart of FIG. 5 at predetermined processing intervals (e.g., every 2 ms). Upon start of the target current controlling process, in step S1, the damping force setting unit 52 of the damper control apparatus 50 determines a dynamic state of the automobile V based on dynamic state quantities such as the accelerations of the vehicle body 1 obtained by the lateral G sensor 10, longitudinal G sensor 11 and vertical G sensor 14, the vehicle speed input from the vehicle speed sensor 9, and a steering speed input from a steering angle sensor (not shown in the drawings). Then, the damping force setting unit 52 calculates a skyhook control target value Dsh, roll control target value Dr, and pitch control target value Dp in steps S2, S3 and S4, respectively, for each damper 4.

Subsequently, the damping force setting unit 52 determines whether or not the actual stroke speed Ss of each damper 4 is positive in step S5, and if the determination result is "Yes" (i.e., the damper 4 is being expanded), sets the largest of the three control target values Dsh, Dr and Dp as a target damping force Dtgt in step S6 and provides the target damping force Dtgt to the target current setting unit 53 in step S8. If the determination result in step S5 is "No" (i.e., the damper 4 is being contracted), the damping force setting unit 52 sets the smallest of the three control target values Dsh, Dr and Dp as the target damping force Dtgt in step S7 and provides the target damping force Dtgt to the target current setting unit 53 in step S8.

In step S9, the target current setting unit 53 sets a target current Itgt based on the target damping force Dtgt. Then, in step S10, the output interface 54 of the damper control apparatus 50 outputs the drive current to the MLV coil 40 of each damper 4 based on the target current Itgt set in step S9.

<Target Current Setting Process>

Figure 6:
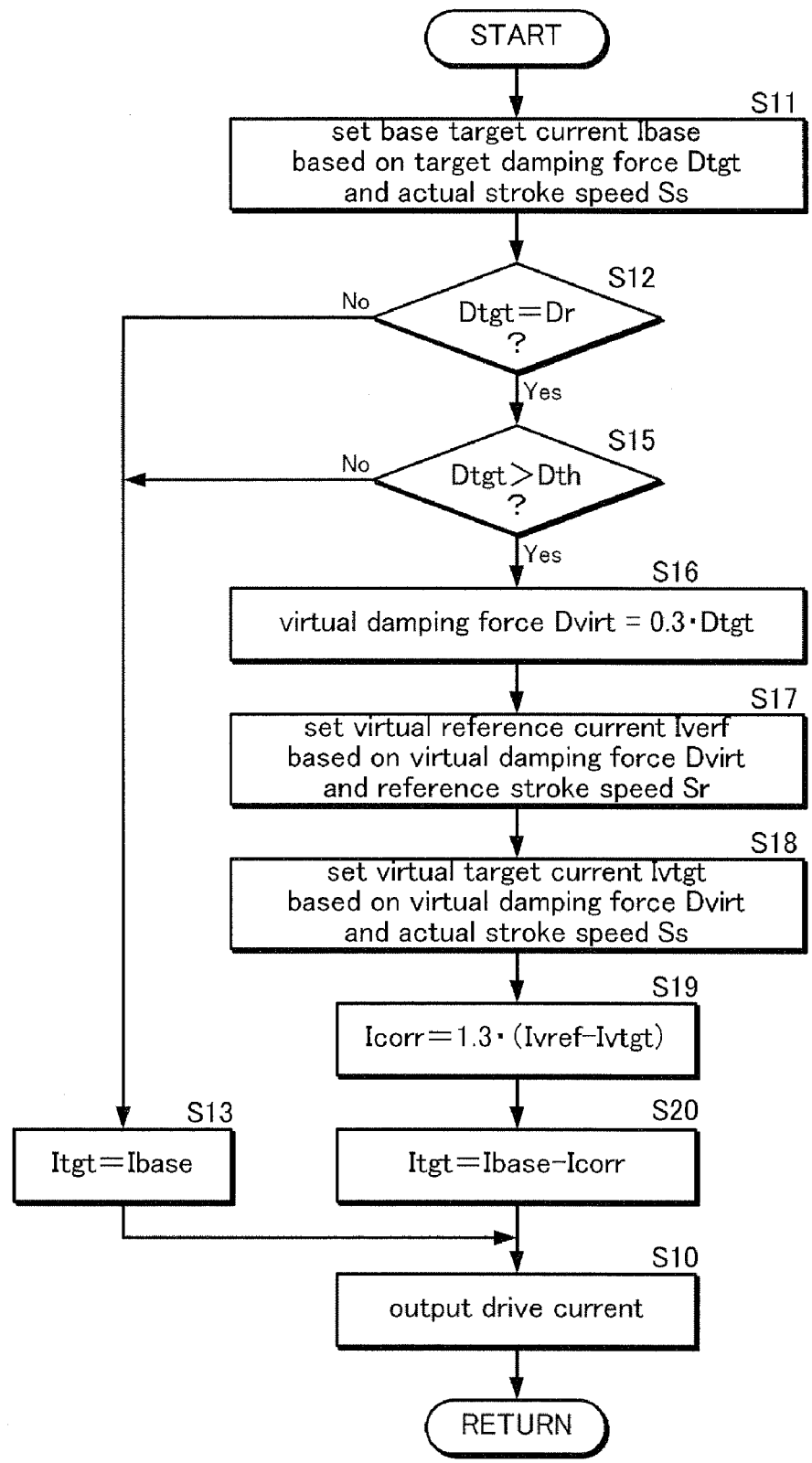
FIG. 6 is a flowchart showing the steps of a target current setting process regarding the first embodiment.
Figure 7:
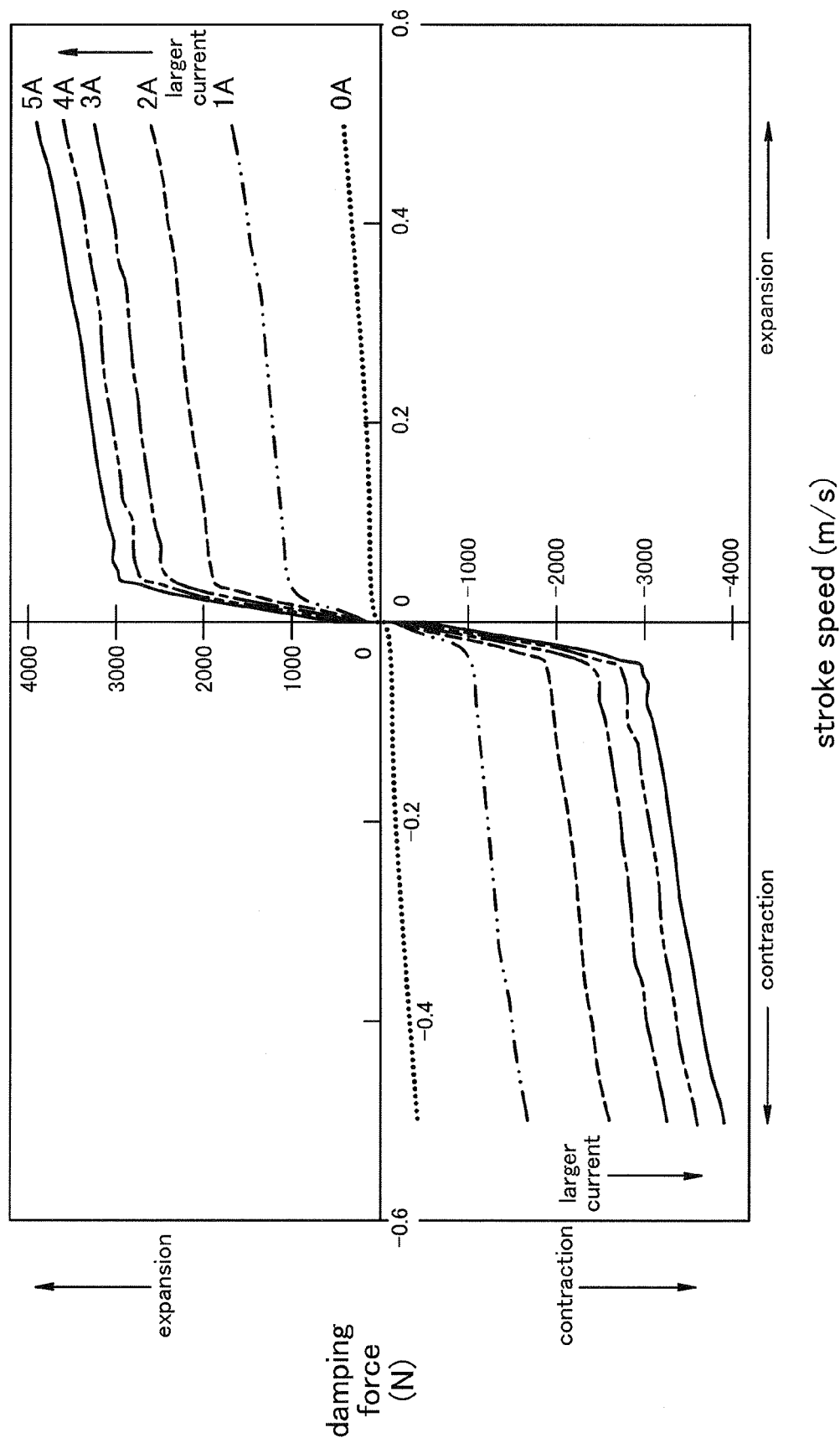
FIG. 7 is a target current map regarding the first embodiment.
Figure 8:
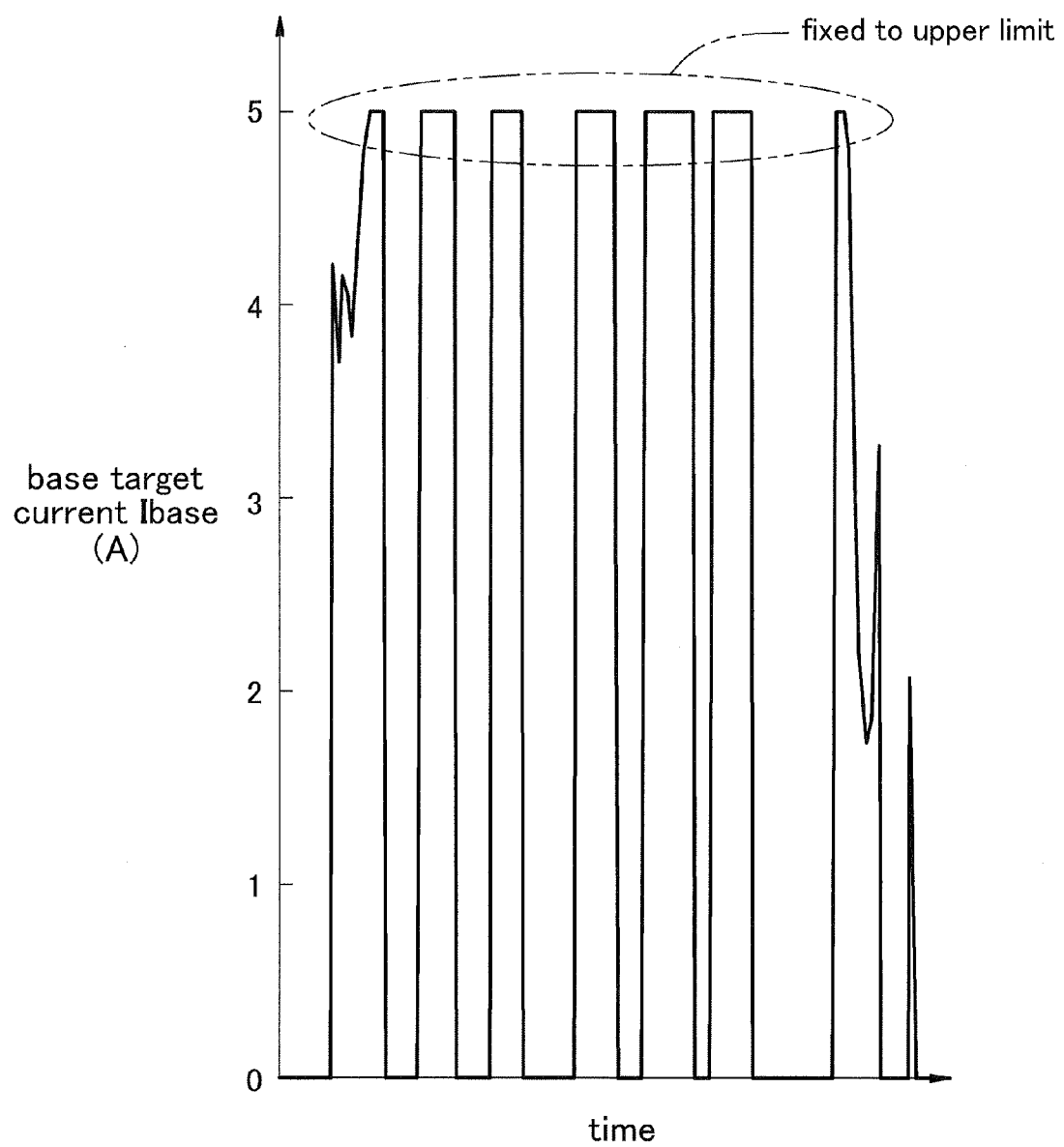
FIG. 8 is a graph showing a change of a base target current regarding the first embodiment.

FIG. 6 shows detailed steps of the target current setting process (step S9) in FIG. 5 conducted by the target current setting unit 53. Upon start of the target current setting process, in step S11, the target current setting unit 53 refers to a target current map of FIG. 7 to retrieve/set a base target current Ibase (FIG. 8) corresponding to the target damping force Dtgt and the actual stroke speed Ss. As will be appreciated from FIG. 8, the base target current Ibase is fixed to its upper limit (5 A) for certain periods of time at several points.

Subsequently, in step S12, the target current setting unit 53 determines whether or not the target damping force Dtgt is equal to the roll control target value Dr, and if the determination result is "No", sets the above base target current Ibase as the target current Itgt in step S13 and outputs a drive current corresponding to the target current Itgt to the MLV coil 40 of each damper 4 in step S10.

On the other hand, if the target damping force Dtgt is equal to the roll control target value Dr and thus the determination result is "Yes" in step S12, the target current setting unit 53 determines in step S15 whether or not the target damping force Dtgt exceeds a high damping determination threshold value Dth (e.g., 4,000N), and if the determination result is "No", sets the above base target current Ibase as the target current Itgt and outputs a drive current corresponding to the target current Itgt to the MLV coil 40 of each damper 4 in step S10.

Figure 9:
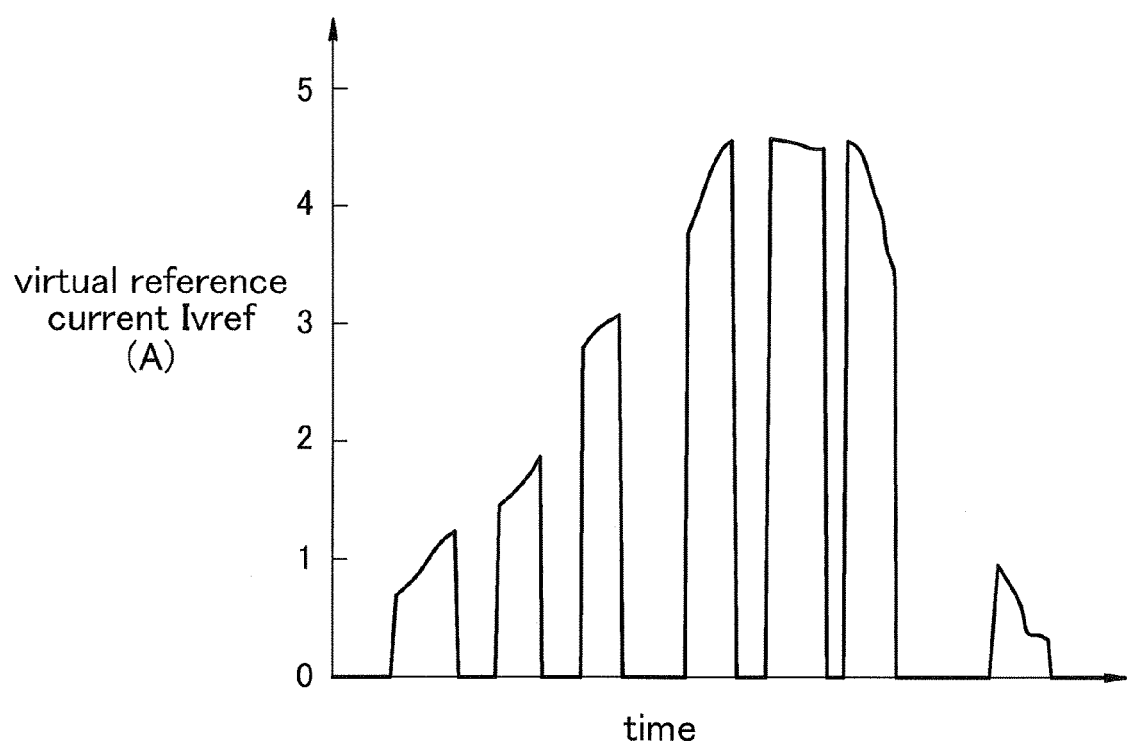
FIG. 9 is a graph showing a temporal change of a virtual reference current regarding the first embodiment.
Figure 10:
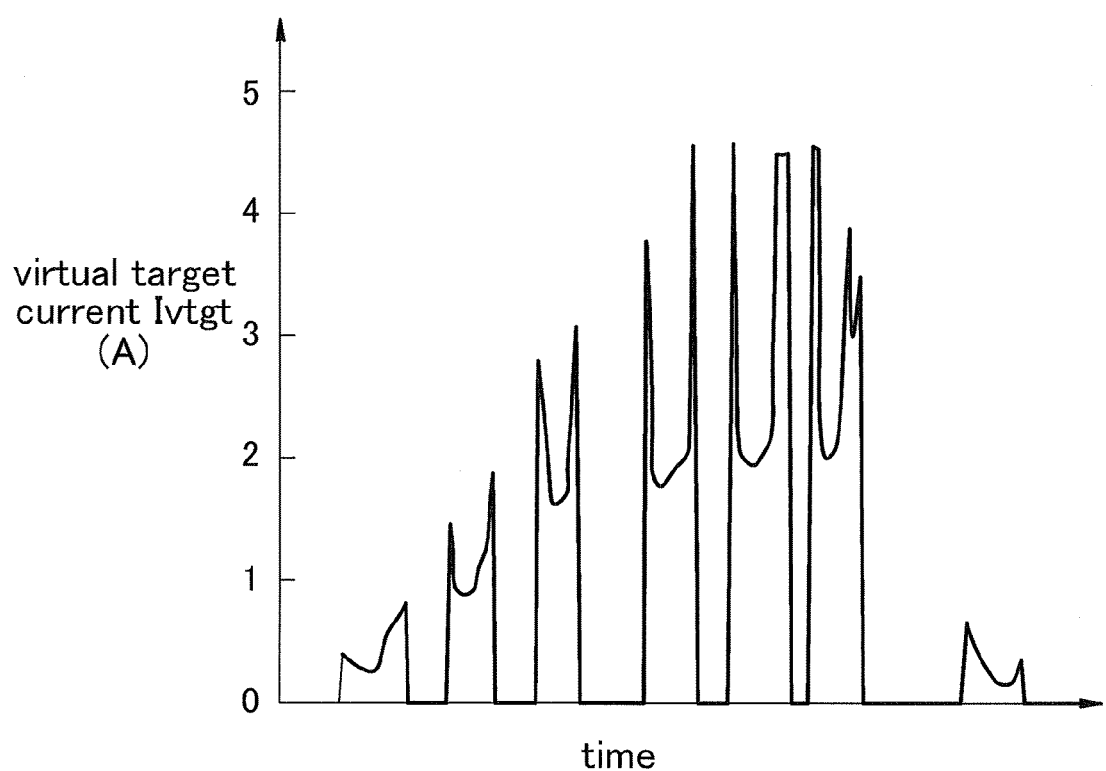
FIG. 10 is a graph showing a temporal change of a virtual target current regarding the first embodiment.

If the target damping force Dtgt exceeds the high damping determination threshold value Dth and hence the determination result in step S15 is "Yes", the target current setting unit 53 calculates a virtual damping force Dvirt by multiplying the target damping force Dtgt with a reduction coefficient (e.g., 0.3 in this embodiment) in step S16. Then, the target current setting unit 53 refers to the target current map to retrieve/set a virtual reference current Ivref (FIG. 9) based on the virtual damping force Dvirt and the reference stroke speed Sr in step S17, and refers to the target current map to retrieve/set a virtual target current Ivtgt (FIG. 10) based on the virtual damping force Dvirt and the actual stroke speed Ss in step S18.

Figure 11:
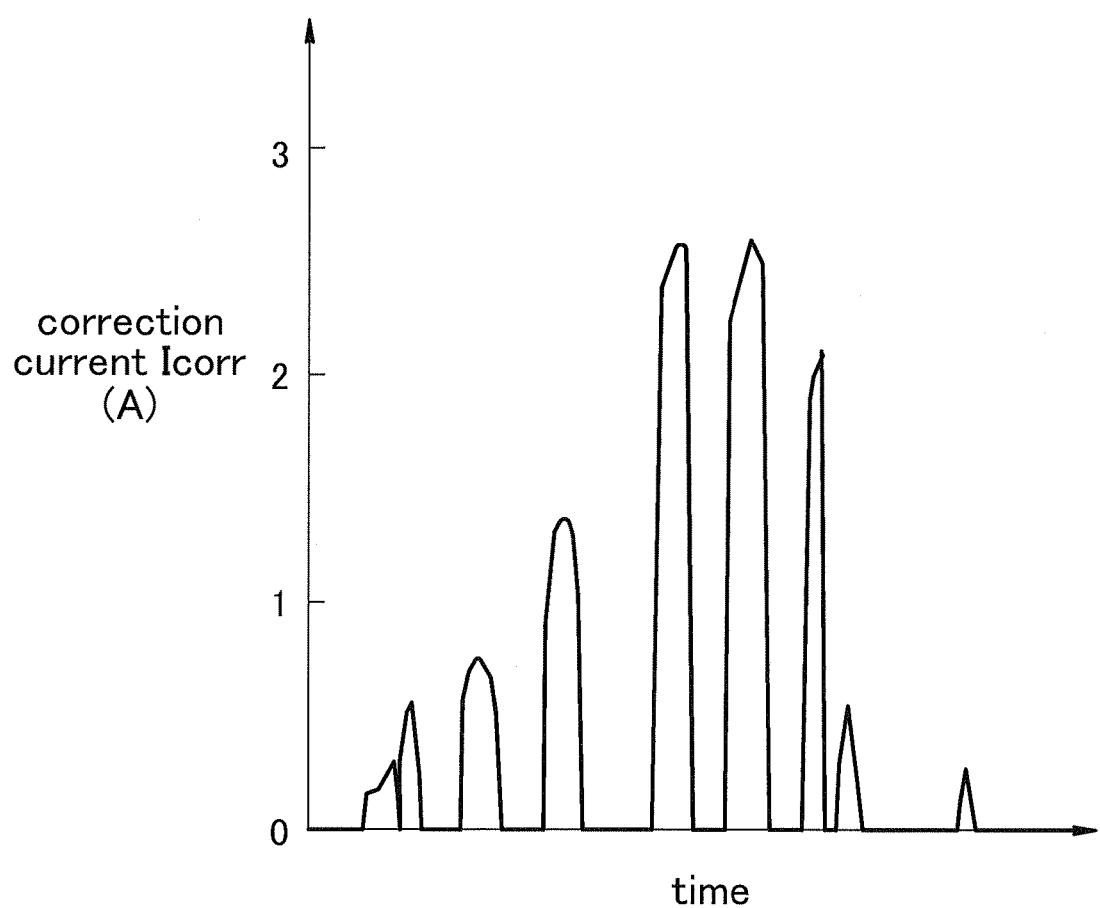
FIG. 11 is a graph showing a temporal change of a correction current regarding the first embodiment.
Figure 12:
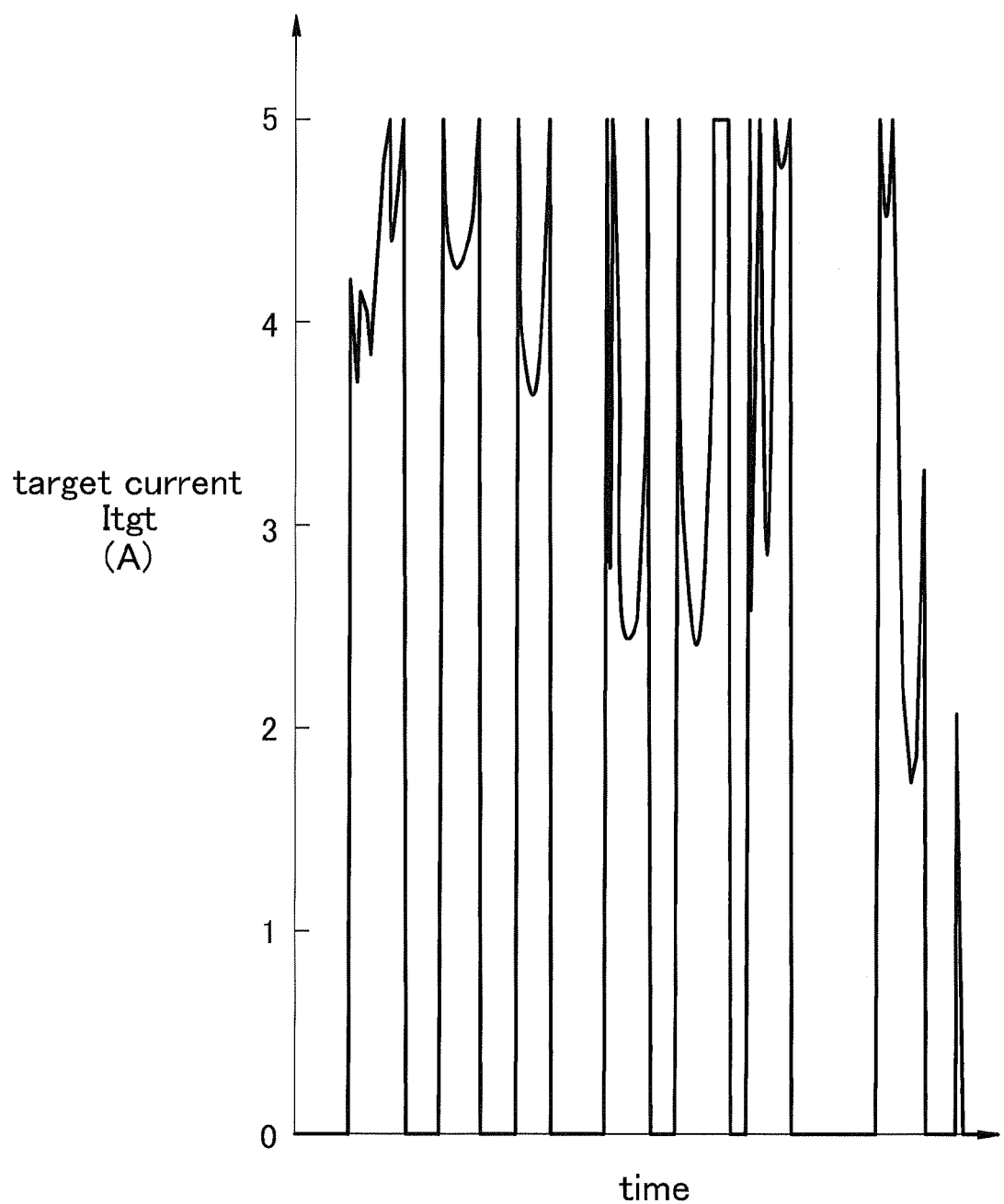
FIG. 12 is a graph showing a temporal change of a target current regarding the first embodiment.

Thereafter, the target current setting unit 53 calculates a correction current Icorr (FIG. 11) by subtracting the virtual target current Ivtgt from the virtual reference current Ivref and multiplying the subtraction result with a predetermined restoration coefficient (e.g., 1.3 in this embodiment) in step S19. Then, the target current setting unit 53 calculates the target current Itgt (FIG. 12) by subtracting the correction current Icorr from the base target current Ibase in step S20, and outputs a drive current corresponding to the target current Itgt to the MLV coil 40 of each damper in step S10.

In the above first embodiment, owing to the above described structure, even when the target damping force becomes high in such cases as when the vehicle undergoes a slalom run, it is ensured that the target current Itgt (and hence the damping force) is allowed to decrease in response to an increase of the actual stroke speed Ss (and increase in response to a decrease of the actual stroke speed Ss), and thus it is possible to ease upward impact caused by road surface irregularities and improve riding comfort.

Second Embodiment

Next, an explanation is made to a second embodiment of the control apparatus of a variable damping force damper according to the present invention. In the second embodiment, the structures of the automobile and variable damping force damper to which the present invention is applied may be the same as those shown in FIGS. 1 and 2, respectively, and thus detailed explanation thereof is omitted. Further, the general structure of the control apparatus of a variable control damper of the second embodiment may be the same as that of the first embodiment shown in FIG. 3 and the general flow of the damping force control process of the second embodiment may be the same as that of the first embodiment shown in FIG. 4, and thus detailed explanation thereof is also omitted.

<Roll Control Unit>

Figure 13:
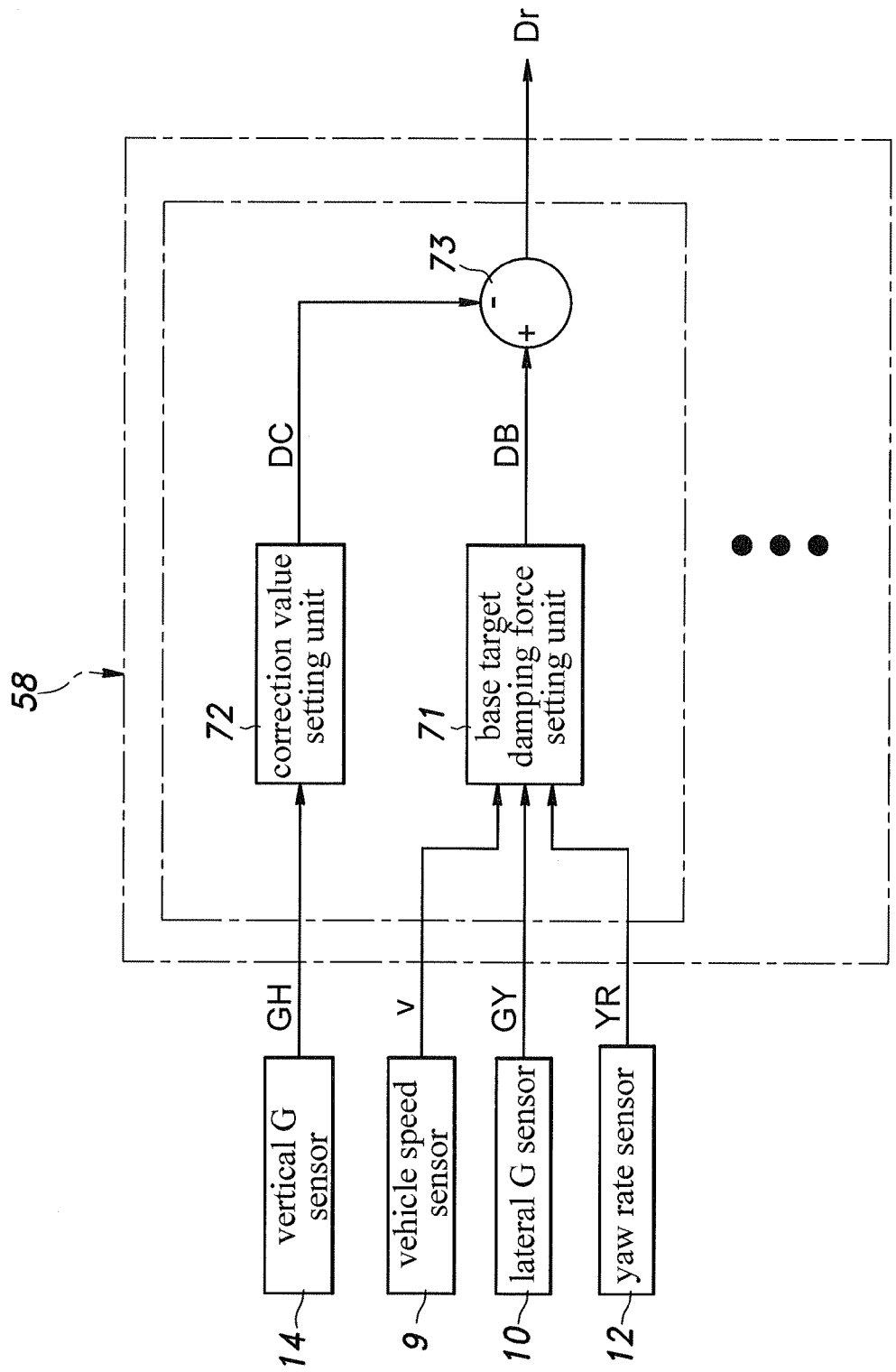
FIG. 13 is a block diagram showing a general structure of a roll control unit regarding a second embodiment of the invention.

With reference to FIG. 13, in the second embodiment of the control apparatus of a variable damping force damper, the roll control unit 58 comprises, for each wheel 3: a target damping force base value setting unit (hereinafter referred to as base value setting unit) 71 for setting a target damping force base value DB based on dynamic state quantities of the vehicle body 1 such as the vehicle speed signal v input from the vehicle speed sensor 9, lateral acceleration signal GY input from the lateral G sensor 10 and yaw rate signal YR input from the yaw rate sensor 12; a correction value setting unit 72 for setting a damping force correction value DC based on a vertical dynamic state quantity of the vehicle body 1 such as the acceleration signal GH input from the vertical G sensor 14; and a target damping force calculating unit 73 for calculating a roll control target value Dr by subtracting the damping force correction value DC from the target damping force base value DB. The correction value setting unit 72 is constituted by a phase compensation filter for effecting phase compensation to the vertical acceleration GH, a compensation gain multiplying unit for multiplying the vertical acceleration GH with a compensation gain, and so on.

<Roll Control Target Value Calculation>

Figure 14:
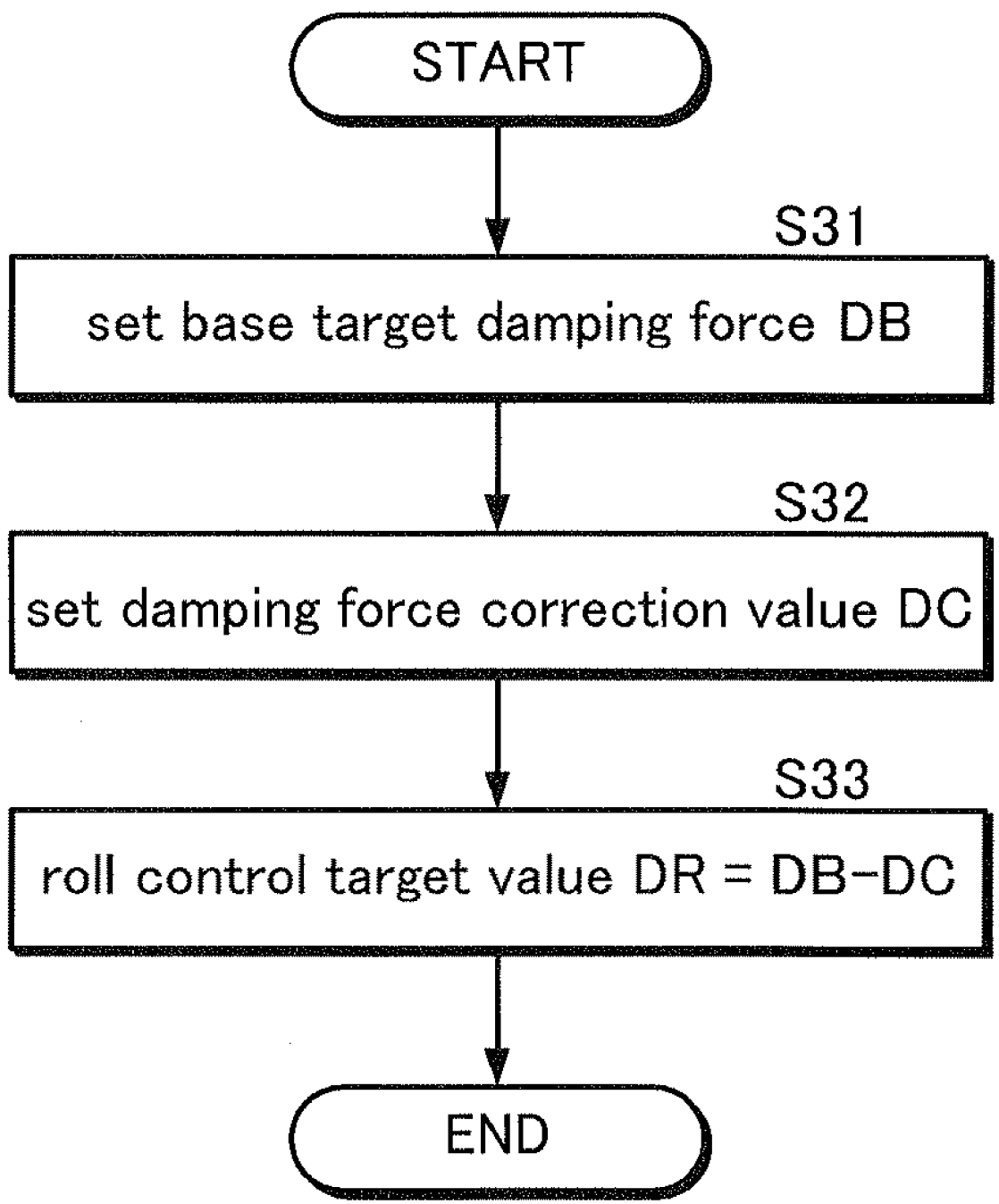
FIG. 14 is a flowchart showing the steps for calculating a roll control target value regarding the second embodiment.

In the roll control unit 58 of the control apparatus 50 according to the second embodiment, the calculation of the roll control target value Dr in step S3 of FIG. 4 is conducted as shown in the flowchart of FIG. 14.

First, in step S31, the base value setting unit 71 sets the target damping force base value DB based on the vehicle speed signal v, lateral acceleration signal GY and yaw rate signal YR. In step S32, the correction value setting unit 72 sets the damping force correction value DC by effecting phase compensation to the vertical acceleration signal GH and/or multiplying the vertical acceleration signal GH with the compensation gain. Thereafter, in step S33, the target damping force calculating unit 73 subtracts the damping force correction value DC from the target damping force base value DB to thereby obtain the roll control target value Dr.

Other steps are the same as those shown in FIG. 4.

Figure 15:
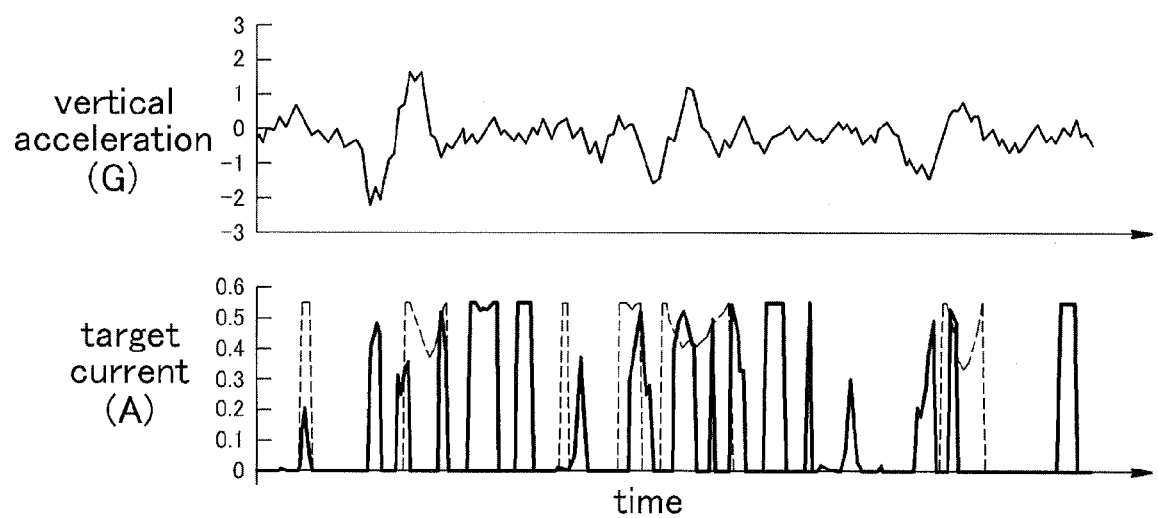
FIG. 15 is a graph showing a temporal change of a target a target current during a slalom run.

FIG. 15 is a graph showing a temporal change of the target current (or drive current) during a slalom run according to the second embodiment of the invention, in which broken lines show a case where the target damping force base value DB is used unmodified as the roll control target value Dr (target damping force Dtgt) while a solid line shows a case where a correction is made to the target damping force base value DB by using the damping force correction value DC to obtain the roll control target value Dr (this embodiment). As will be appreciated from FIG. 15, even when the differentiation value of the lateral acceleration is large (i.e., the target damping force base value DB is large) and hence the telescopic movements of the damper 4 could be difficult in the conventional direction, this embodiment can allow the target current to be increased/decreased to ease upward impact when the vertical accelerations of the vehicle body 1 are generated due to road surface irregularities, and therefore it is possible to effectively prevent deterioration of riding comfort.

Although the present invention has been described in terms of preferred embodiments thereof, it is obvious to a person skilled in the art that various alterations and modifications are possible without departing from the scope of the present invention which is set forth in the appended claims. For example, in the above embodiments, the present invention was applied to the roll control, but the present invention is also applicable to pitch control, bounce control, stability control, etc. Also, although the present invention was applied to the variable damping force damper using an MRF as an operating fluid in the above embodiment, the present invention may be applicable to current-controlled variable damping force dampers of other types or mechanically controlled variable damping force dampers.

The reduction coefficient and restoration coefficient may not be limited to the values shown in the first embodiment, and may be other appropriate values which can be determined experimentally or by simulation.

Also, although the vertical acceleration detected by the vertical G sensor was used as a vertical dynamic state quantity of a vehicle body in the second embodiment, it is also possible to use a vertical speed of the vehicle body as the vehicle dynamic state quantity and/or differentiate the signal from the vertical speed sensor to obtain the vertical acceleration.

In addition, the concrete structures of the automobile and/or control apparatus as well as the concrete steps of the control process may be modified or altered appropriately within the scope of the present invention.

The disclosure of the original Japanese patent applications (Japanese Patent Application No. 2007-071719 filed on Mar. 20, 2007 and Japanese Patent Application No. 2007-081115 filed on Mar. 27, 2007) on which the Paris Convention priority claim is made for the present application is hereby incorporated by reference in its entirety.

The invention claimed is:

1. A control apparatus of a variable damping force damper used to suspend a vehicle body of a vehicle, comprising:
a vertical dynamic state quantity detecting unit configured to detect at least one vertical dynamic state quantity which comprises at least an actual stroke speed of the damper; and
a dynamic state quantity detecting unit configured to detect a plurality of dynamic state quantities selected from a group consisting of a lateral acceleration, a fore and aft acceleration, and a yaw rate of the vehicle body;
wherein the control apparatus comprises a target damping force setting unit for setting a target damping force of the variable damping force damper based on at least part of the plurality of dynamic state quantities of the vehicle and is configured to set a target control quantity of the variable damping force damper based on the selected plurality of dynamic state quantities of the vehicle, and to reduce the target control quantity according to the at least one vertical dynamic state quantity when the target damping force set by the target damping force setting unit is greater than a threshold value.

2. The control apparatus of a variable damping force damper according to claim 1,
wherein the control apparatus further comprises:
a base control quantity setting unit for setting a base control quantity of the variable damping force damper based on the target damping force and the actual stroke speed of the variable damping force damper;
a damping force determining unit for determining whether or not the target damping force exceeds a prescribed high damping determination threshold value;
a virtual damping force calculating unit for calculating a virtual damping force by multiplying the target damping force with a prescribed reduction coefficient;
a virtual target control quantity setting unit for setting a virtual target control quantity of the variable damping force damper based on the virtual damping force and the actual stroke speed of the variable damping force damper;
a correction control quantity calculating unit for calculating a correction control quantity based on the virtual target control quantity; and
a target control quantity calculating unit for calculating the target control quantity by subtracting the correction control quantity from the base control quantity when the damping force determining unit determines that the target damping force exceeds the prescribed high damping determination threshold value.

3. The control apparatus of a variable damping force damper according to claim 2,
wherein the target control quantity setting unit further comprises a virtual reference control quantity setting unit for setting a virtual reference control quantity of the variable damping force damper based on the virtual damping force and a prescribed reference stroke speed, and
wherein the correction control quantity calculating unit calculates the correction control quantity by subtracting the virtual target control quantity from the virtual reference control quantity and multiplying the subtraction result with a prescribed restoration coefficient.

4. The control apparatus of a variable damping force damper according to claim 1,
wherein the vertical dynamic quantity of the vehicle further includes a vertical dynamic quantity of the vehicle body, and
wherein the control apparatus comprises:
a target damping force setting unit for setting a target damping force of the variable damping force damper based on a first subset of the plurality of dynamic state quantities of the vehicle, and
a target control quantity setting unit for setting the target control quantity of the variable damping force damper based on at least the target damping force,
wherein the first subset of the plurality of dynamic state quantities of the vehicle includes the vertical dynamic quantity of the vehicle body.

5. The control apparatus of a variable damping force damper according to claim 4, wherein the target damping force setting unit comprises:
a target damping force base value setting unit for setting a target damping force base value based on a second subset of the plurality of dynamic state quantities of the vehicle;
a correction value setting unit for setting a damping force correction value based on the vertical dynamic state quantity of the vehicle body; and
a target damping force calculating unit for calculating the target damping force by subtracting the damping force correction value from the target damping force base value.

6. The control apparatus of a variable damping force damper according to claim 1, wherein the control apparatus is configured to set the target control quantity of the variable damping force damper from a skyhook control target value, a roll control target value and a pitch control target value.

7. The control apparatus of a variable damping force damper according to claim 6, wherein the control apparatus is configured to set a largest one of the three control target values as the target control quantity of the variable damping force damper when the damper is being expanded, and a smallest one of the three control target values as the target control quantity of the variable damping force damper when the damper is being contracted.

* * * * *